Inventor
Bertel P. S. Sörensen

UNITED STATES PATENT OFFICE.

BERTEL PEDER SÓRINUS SÓRENSEN, OF NIM, DENMARK, ASSIGNOR OF ONE-THIRD TO MAGNUS LAURITZEN, OF HORSENS, DENMARK, AND ONE-THIRD TO PAUL SORENSEN.

COUPLING DEVICE.

1,235,944.  Specification of Letters Patent.  Patented Aug. 7, 1917.

Application filed June 13, 1917. Serial No. 174,562.

*To all whom it may concern:*

Be it known that I, BERTEL PEDER SÓRINUS SÓRENSEN, owner of a mill, citizen of the Kingdom of Denmark, residing at the city of Nim, county of Bartens, Denmark, have invented certain new and useful Improvements in Coupling Devices, of which the following is a specification.

The present invention has for its object the provision of a coupling-device especially applicable for the attachment of the team to agricultural machines. In such couplings, it is of the greatest importance that the neck yoke ordinarily attached to the outer end of the tongue of the machine be brought into the nearest possible contact with the harness of the team for the purpose of preventing rolling of the machine during working. Furthermore, it is of great importance that during the driving the horses can not by tossing their heads bring the reins or the lines around the outer end of the neck yoke, as often happens with the ordinary couplings, in which latter the outer end of the neck yoke extends beyond the breast-ring of the harness.

These drawbacks are avoided by means of the improved coupling-device constituting the present invention, in which the coupling-device forms a fixed whole with the tongue or its neck-yoke, so that the latter comes in direct connection with the breast-ring of the team. The invention is further characterized by the fact that the coupling takes place beyond the outer end of the neck-yoke, so that the coupling itself prevents the lines or the reins from catching the neck yoke which otherwise would make it necessary to stop the work until the driver or some other person has released the lines.

An embodiment of the invention is shown in the accompanying drawing, in which.

Figure 1:
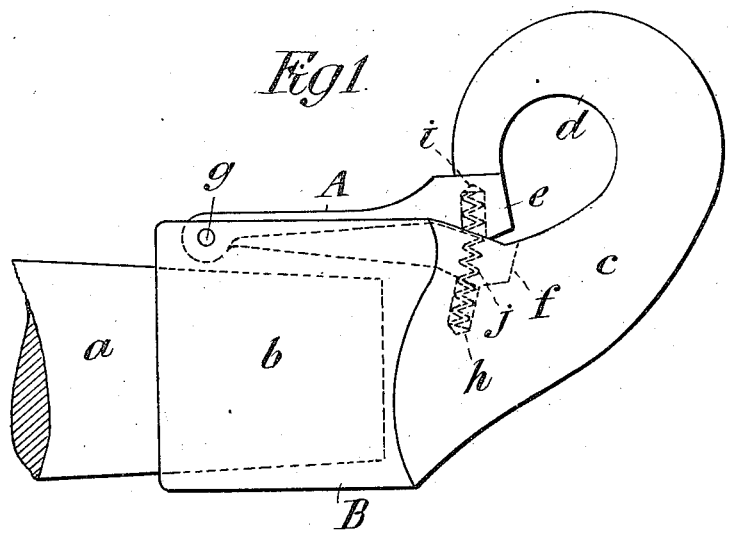
Figure 1 is a side view of the improved coupling-device.
Figure 2:
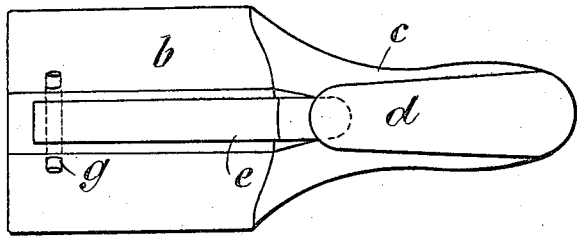
Fig. 2 is a plan of the same.
Figure 3:
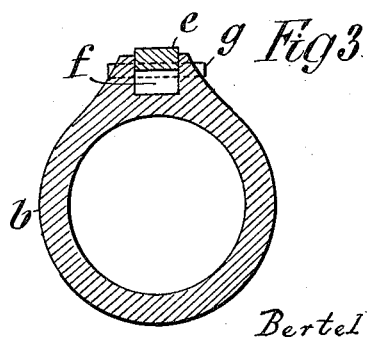
Fig. 3 is a cross-section on line A—B, Fig. 1.

The coupling-device consists of a ferrule $b$, which is fitted on the outer end of the neck yoke $a$ and extends beyond the same, where it takes the form of a curved neck $c$, which is bent upward and terminates in a hook $d$. This hook $d$ is disposed close to, and overhangs the base of the neck $c$.

The upper side of the ferrule $b$ is provided with a longitudinal slot or opening $f$ for a lever $e$, the latter being pivoted at its inner or rear end $g$ to the ferrule and normally having its free outer end in contact with the end of the hook, so as to close said hook. The outer end of the slot $f$ is likewise overhung by the hook, as will be understood.

The lever $e$ is normally pressed against the end of the hook by means of a spiral spring $j$ located in sockets $h$ and $i$ provided, respectively, in the upper side of the neck and the under side of the lever $e$.

The spiral spring $j$ may be replaced by a spiral spring inserted on the pivot $g$, or by a flat spring normally pressing the lever $e$ against the end of the hook; or the spring may be omitted and the lever replaced by a spring fixed at $g$ to the ferrule $b$ and having its free end normally in contact with the end of the hook.

When the neck yoke is connected with the breast-ring of the harness, said ring is pressed against the lever $e$, thereby pressing down the free end of said lever so that the breast-ring can be carried into the hook. This done, the lever again closes the hook, so that the coupling can only be released after the lever has been pressed down.

It will be seen that by the described arrangement, the neck yoke is brought into the nearest possible contact with the harness, and that the end of the said yoke bar does not extend beyond the breast-ring to catch the reins or the lines.

I claim as my invention:—

1. A coupling, comprising a ferrule adapted to fit on the end of the neck yoke and having its upper side provided with a longitudinal slot, said ferrule extending beyond the yoke end in the form of a curved neck which terminates in an upwardly and inwardly directed hook whose free end is disposed adjacent the base of said neck and overhangs the outer end of said slot; and a pivoted closure for said hook lying in said slot and having its outer end disposed between said base and the free end of said hook and normally contacting with said hook end.

2. A coupling, comprising a ferrule adapted to fit on the end of the neck yoke and having its upper side provided with a longitudinal slot, said ferrule extending beyond the yoke end in the form of a curved neck which terminates in an upwardly and inwardly directed hook whose free end is disposed adjacent the base of said neck and overhangs said slot; a lever lying in said slot and pivoted at its rear end therein, the outer end of said lever being disposed between said base and the free end of said hook, the last-named lever end and said base being formed with oppositely-located sockets; and a spring having its ends fitted in said sockets to normally hold the said outer end of the lever in contact with the said free end of the hook.

In testimony whereof I affix my signature.

BERTEL PEDER SÖRINUS SÖRENSEN.

Copies of this patent may be obtained for five cents each, by addressing the "Commissioner of Patents, Washington, D. C."